US007774111B2

(12) United States Patent
Oesterling et al.

(10) Patent No.: US 7,774,111 B2
(45) Date of Patent: Aug. 10, 2010

(54) METHOD AND SYSTEM FOR PROVIDING VEHICLE EMISSIONS DATA TO AN AUTHORIZED RECIPIENT

(75) Inventors: Christopher L. Oesterling, Troy, MI (US); Carl J. Hering, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 806 days.

(21) Appl. No.: 11/463,134

(22) Filed: Aug. 8, 2006

(65) Prior Publication Data

US 2008/0039983 A1 Feb. 14, 2008

(51) Int. Cl.
*G01M 15/00* (2006.01)
*G01M 15/10* (2006.01)

(52) U.S. Cl. .......................................... 701/33; 701/32

(58) Field of Classification Search ....................... None
See application file for complete search history.

(56) References Cited

U.S. PATENT DOCUMENTS

| | | | | |
|---|---|---|---|---|
| 5,442,553 | A * | 8/1995 | Parrillo | 455/420 |
| 6,611,740 | B2 * | 8/2003 | Lowrey et al. | 701/29 |
| 6,636,790 | B1 | 10/2003 | Lightner et al. | |
| 6,732,031 | B1 * | 5/2004 | Lightner et al. | 701/33 |
| 6,732,032 | B1 * | 5/2004 | Lowrey et al. | 701/33 |
| 6,754,485 | B1 * | 6/2004 | Obradovich et al. | 455/414.1 |
| 6,879,894 | B1 * | 4/2005 | Lightner et al. | 701/33 |
| 6,928,348 | B1 | 8/2005 | Lightner et al. | |
| 2003/0139179 | A1 * | 7/2003 | Fuchs et al. | 455/426 |
| 2004/0054444 | A1 * | 3/2004 | Abeska et al. | 701/1 |
| 2004/0203696 | A1 | 10/2004 | Jijina et al. | |
| 2004/0203903 | A1 | 10/2004 | Wilson et al. | |
| 2005/0043868 | A1 * | 2/2005 | Mitcham | 701/29 |
| 2005/0060070 | A1 * | 3/2005 | Kapolka et al. | 701/29 |
| 2005/0068174 | A1 * | 3/2005 | Oesterling et al. | 340/539.24 |
| 2006/0106584 | A1 | 5/2006 | Oesterling et al. | |
| 2006/0122748 | A1 * | 6/2006 | Nou | 701/29 |
| 2008/0119983 | A1 | 5/2008 | Inbarajan et al. | |
| 2008/0140571 | A1 | 6/2008 | Inbarajan et al. | |

FOREIGN PATENT DOCUMENTS

| | | | |
|---|---|---|---|
| JP | 2002-197214 | * | 7/2002 |
| WO | WO2005039927 | | 5/2005 |

OTHER PUBLICATIONS

RD 422061; Derwent; Jun. 10, 1999.*
RD 475071; Derwent; Nov. 10, 2003.*

* cited by examiner

*Primary Examiner*—Michael J. Zanelli
(74) *Attorney, Agent, or Firm*—Anthony L. Simon; Reising Ethington P.C.

(57) ABSTRACT

A method for providing vehicle emissions data from a vehicle to a remotely located call center, so that the call center can then provide the emissions data to one or more authorized recipients. According to one embodiment, this method includes the steps of receiving a vehicle emissions data request, sending emissions data from one or more vehicle electronic modules (VEMs) to a vehicle telematics unit, and wirelessly transmitting the emissions data to a call center. Once at the call center, the emissions data can then be provided to one or more authorized recipients, which can include governmental entities, according to a number of different techniques.

20 Claims, 3 Drawing Sheets

METHOD AND SYSTEM FOR PROVIDING VEHICLE EMISSIONS DATA TO AN AUTHORIZED RECIPIENT

TECHNICAL FIELD

The present invention relates generally to the acquisition and use of vehicle emissions data, and more particularly, to gathering such data from a vehicle and providing it to an authorized recipient, such as a governmental entity, for purposes of emissions certification.

BACKGROUND OF THE INVENTION

Some governmental regulations currently require vehicle owners to have their vehicle emissions periodically checked by a certified testing facility to verify that they do not exceed predetermined limits. Often times, the regulations require that the owners take their vehicles to certified facilities to collect vehicle emissions data from the vehicle. The vehicle emissions data is typically collected in one of several different ways. According to one method, the vehicle emissions are measured by a device that is connected to the vehicle's tailpipe while the vehicle is being driven on a dynamometer over a driving cycle that simulates typical city driving and includes periods of acceleration, cruise, and deceleration. According to another method which is used primarily with newer vehicles, various electronic modules located throughout the vehicle collect vehicle emissions data while the vehicle is being driven. This data can then be transferred from an onboard diagnostic port (OBDII port) on the vehicle to a certified diagnostic machine that is designed to collect such information.

After the vehicle emissions test is complete, the vehicle owner is usually provided with test results in the form of a computer generated report. Some governmental regulations require that the vehicle owner then provide the test results to a designated governmental entity, like a Secretary of State or a Department of Motorized Vehicles, before they are able to register or renew their vehicle license plates.

SUMMARY OF THE INVENTION

According to one aspect of the invention, there is a method for providing vehicle emissions data to an authorized recipient. The method comprises the steps: (a) receiving a vehicle emissions data request; (b) sending the vehicle emissions data from at least one vehicle electronic module (VEM) to a vehicle telematics unit; (c) wirelessly transmitting the vehicle emissions data from the vehicle telematics unit to a call center; and (d) making the vehicle emissions data available to the authorized recipient so that a subscriber cannot modify the vehicle emissions data.

According to another aspect of the invention, there is a method for providing vehicle emissions data to a governmental entity. This method comprises the steps: (a) receiving a vehicle emissions data request; (b) querying at least one vehicle electronic module (VEM) for the vehicle emissions data; (c) sending the vehicle emissions data from the vehicle electronic module (VEM) to a vehicle telematics unit over a vehicle communications bus; (d) wirelessly transmitting the vehicle emissions data and an electronic identifier from the vehicle telematics unit to a call center; and (e) providing the vehicle emissions data to a governmental entity by: i) informing a subscriber that the vehicle emissions data is available, and iii) providing the vehicle emissions data to the governmental entity upon proper authorization, wherein the subscriber cannot modify emissions data that is provided to the governmental entity.

According to yet another aspect of the invention, there is a system for providing vehicle emissions data to a governmental entity. The system generally comprises a wireless carrier system; a vehicle electronic module (VEM) that gathers vehicle emissions data from one or more sensors; a vehicle telematics unit that provides communication services and is connected to the vehicle electronic module (VEM) and the wireless carrier system; and a call center that processes various user requests and is connected to the wireless carrier system.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The method for providing vehicle emissions data described below can be used to conveniently provide a designated recipient, such as a governmental entity, with information pertaining to the emissions produced by a vehicle. By wirelessly transmitting vehicle emission data from a vehicle to a call center and then providing that data from the call center to a governmental entity, the present method enables a vehicle owner to certify their vehicle's emissions without having to bring the vehicle into a designated service station or the like.

Communications System

Figure 1:
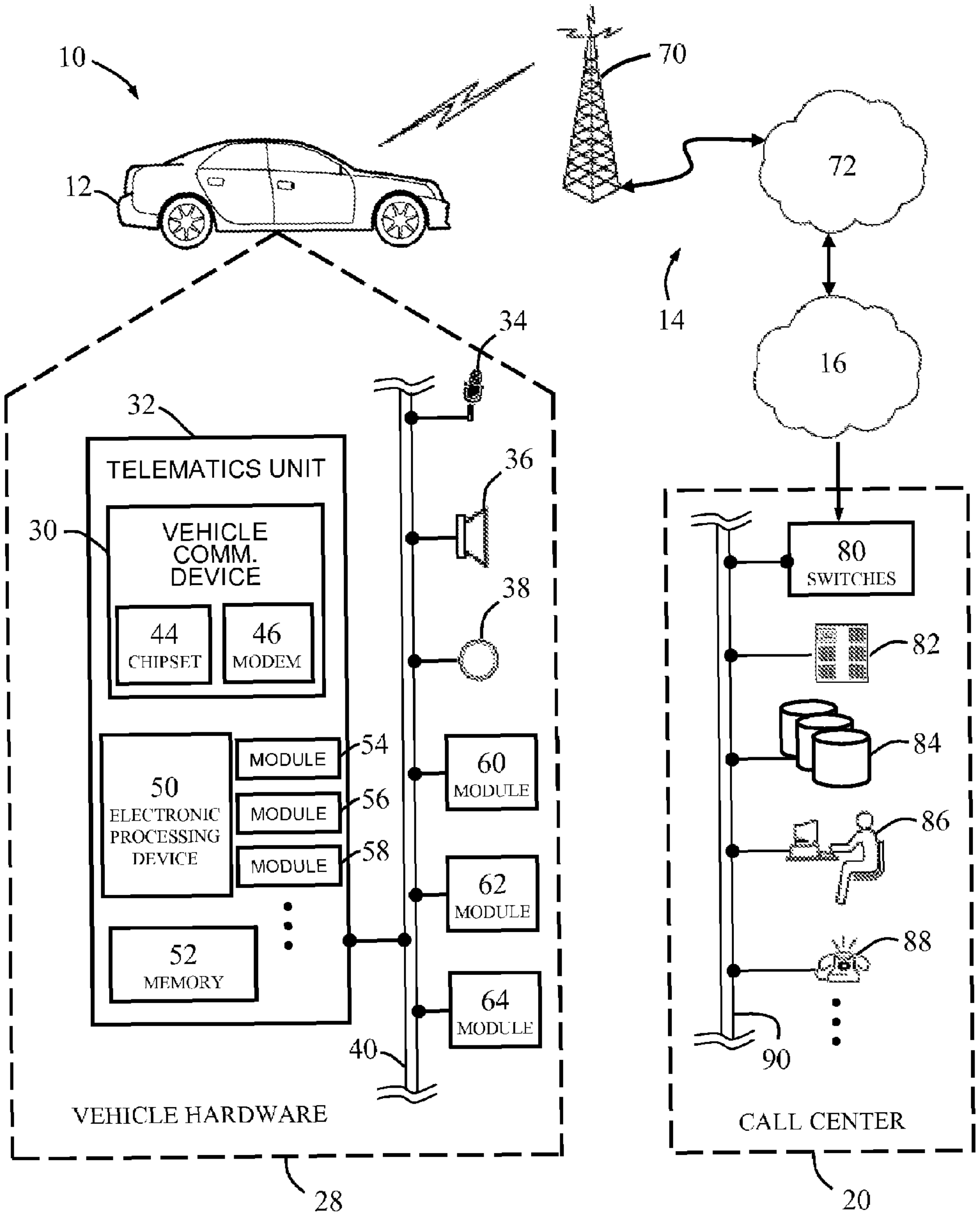
FIG. 1 is a block diagram showing an embodiment of a system capable of utilizing the method of providing vehicle emissions data described below.

Turning now to FIG. 1, there is shown an example of a communications system 10 that is capable of utilizing the emissions data provision method discussed below. Communications system 10 generally includes a vehicle 12, a wireless carrier system 14, a communications land network 16, and a call center 20. It should be appreciated that the overall architecture, setup and operation, as well as the individual components, of a system such as that shown here are generally known in the art. Thus, the following paragraphs simply provide a brief overview of one such exemplary communication system 10, however, other systems not shown here could employ the disclosed method as well.

Vehicle 12 is preferably a mobile vehicle such as a motorcycle, car, truck, recreational vehicle (RV), boat, plane, etc., and is equipped with suitable hardware and software that enables it to communicate over system 10. Some of the vehicle hardware 28 is shown generally in FIG. 1 and includes a telematics unit 32, a microphone 34, a speaker 36, buttons and/or controls 38, and several vehicle electronic modules (VEMs) 60-64 that are interconnected using a network connection or communications bus 40. Examples of suitable network connections include a controller area network (CAN), a media oriented system transfer (MOST), a local interconnection network (LIN), an ethernet, and other appropriate connections such as those that conform with known ISO, SAE and IEEE standards and specifications, to name but a few.

The telematics unit 32 includes a vehicle communication device 30 that enables the telematics unit to communicate with the call center 20. Vehicle communications device 30 preferably uses radio transmissions to establish a voice channel with wireless carrier system 14 so that both voice and data transmissions can be sent and received over the voice channel. By providing both voice and data communication, vehicle communications device 30 enables the vehicle to offer a number of different services including those related to navigation, telephony, emergency assistance, diagnostics, infotainment, etc. According to one embodiment, vehicle communications device 30 includes a standard cellular chipset 44 for voice communications like hands-free calling, and a modem 46 for data transmission. In order to enable successful data transmission over the voice channel, modem 46 applies some type of encoding or modulation to convert the digital data so that it can communicate through a vocoder or speech codec incorporated in chipset 44. Any suitable encoding or modulation technique that provides an acceptable data rate and bit error rate can be used with the disclosed method.

The telematics unit 32 is an onboard device that provides a variety of services through its communication with call center 20, and generally includes an electronic processing device 50, one or more types of electronic memory 52, and a number of function-specific devices or modules 54-58. The telematics unit 32 provides a variety of different services including, for example: vehicle emissions data reporting; turn-by-turn directions and other navigation-related services which are provided in conjunction with a GPS-based vehicle navigation unit 54; airbag deployment notification and other emergency or roadside assistance-related services which are provided in connection with various sensors and modules 56 located throughout the vehicle; and infotainment-related services where music, webpages, movies, television programs, videogames and/or other information is downloaded by an infotainment center 58 and stored for current or later playback. The above-listed services are by no means an exhaustive list of all of the capabilities of telematics unit 32, as should be appreciated by those skilled in the art, but are simply an illustration of some of the services that the telematics unit is capable of offering. It is anticipated that telematics unit 32 will include a number of known components in addition to those listed above. The construction and operation of a suitable vehicle mounted telematics unit that can provide the above-identified services is already known and will not be reiterated here.

Vehicle hardware 28 includes a number of devices that provide vehicle occupants with a means of communicating with and through the various components of the vehicle. Such devices may include microphone 34, speakers 36, buttons and/or controls 38, and a visual display, such as a heads-up display or a graphic display in the instrument panel. These devices allow a user to input commands, receive audio/visual feedback, and provide voice communications. Microphone 34 provides an occupant with a means for inputting verbal or other auditory commands, and can be connected to a voice processing unit utilizing human/machine interface (HMI) technology known in the art. Conversely, speaker 36 provides verbal output to a vehicle occupant and can be a dedicated, stand-alone speaker or part of the vehicle audio system. In either event, microphone 34 and speaker 36 enable vehicle hardware 28 and call center 20 to communicate with the occupants through audible speech. Buttons and/or controls 38 enable a vehicle occupant to activate or engage one or more of the vehicle hardware components 28. For instance, button 38 can be an electronic push-button used to initiate voice communication with call center 20 or to initiate a vehicle emissions data request.

The vehicle electronic modules (VEMs) 60-64 are generally electronic hardware components that are located throughout the vehicle and typically receive input from one or more sensors and use the sensed input to perform diagnostic, monitoring, control, reporting and/or other functions. Each of the VEMs 60-64 is preferably connected by communications bus 40 to the other VEMs, as well as to the telematics unit 32, and can be programmed to run vehicle system and subsystem diagnostic tests. As examples, VEM 60 can be an engine control module (ECM) that controls various aspects of engine operation such as fuel ignition and ignition timing, VEM 62 can be a powertrain control module that regulates operation of one or more components of the vehicle powertrain, and VEM 64 can be a body control module that governs various electrical components located throughout the vehicle, like the vehicle's power door locks and headlights. According to one embodiment, engine control module 60 is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. According to another embodiment, powertrain control module 62 can monitor the vehicle evaporation system by performing, for example, a fuel tank evaporation leakage diagnostic test, and/or can perform an oxygen flow diagnostic test. If an excess fuel evaporation leakage indication is present or the oxygen flow is above or below operating specifications, then DTCs are generated responsive to the executed diagnostic tests. As is appreciated by those skilled in the art, the above-mentioned VEMs are only examples of some of the modules that may be used in vehicle 12, as numerous others are also possible.

Wireless carrier system 14 is preferably a cellular telephone system, but could be any other suitable wireless system, such as a satellite-based system, that transmits signals between the vehicle hardware 28 and call center 20. According to an exemplary embodiment, wireless carrier system 14 includes one or more cell towers 70, base stations and/or mobile switching centers (MSCs) 72, as well as any other networking components required to connect the wireless system 14 with land network 16. As is appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements. Preferably, a speech codec or vocoder is incorporated in one or more of the base stations, but depending on the particular architecture of the wireless network, it could be incorporated within the MSC or some other network component as well.

Land network 16 can be a conventional land-based telecommunications network that is connected to one or more landline telephones and connects wireless carrier network 14 to call center 20. For example, land network 16 can include a public switched telephone network (PSTN) and/or a network configured with a TCP/IP protocol suite, as is appreciated by those skilled in the art. Of course, one or more segments of land network 16 could be implemented through the use of a standard wired network, a fiber or other optical network, a cable network, power lines, other wireless networks such as wireless local area networks (WLANs) or networks providing broadband wireless access (BWA), or any combination thereof. Furthermore, call center 20 need not be connected via land network 16, but could include wireless telephony equipment so that it can communicate directly with wireless network 14.

Call center 20 is designed to provide the vehicle hardware 28 with a number of different system back-end functions and, according to the exemplary embodiment shown here, generally includes one or more switches 80, servers 82, databases 84, live advisors 86, as well as a variety of other telecommunication and computer equipment 88 that is known in the art. These various call center components are preferably coupled to one another via a wired or wireless local area network 90. Switch 80, which can be a private branch exchange (PBX) switch, routes incoming signals so that voice transmissions are usually sent to either the live adviser 86 or an automated response system, and data transmissions are passed on to a modem or other piece of equipment 88 for demodulation and further signal processing. The modem preferably includes an encoder, as previously explained, and can be connected to various devices such as a server 82 and database 84. Database 84 could be designed to store past vehicle emissions data, or subscriber authentication information, profile records, behavioral patterns, and other pertinent subscriber information. Data transmissions may also be conducted by wireless systems, such as, for example 802.11x, GPRS, and the like. Although the illustrated embodiment has been described as it would be used in conjunction with a manned call center 20, it will be appreciated that the call center can utilize an unmanned automated call response system and, in general, can be any central or remote facility, manned or unmanned, mobile or fixed, to or from which it is desirable to exchange voice and data transmissions.

Method for Providing Vehicle Emissions Data

Figure 2:
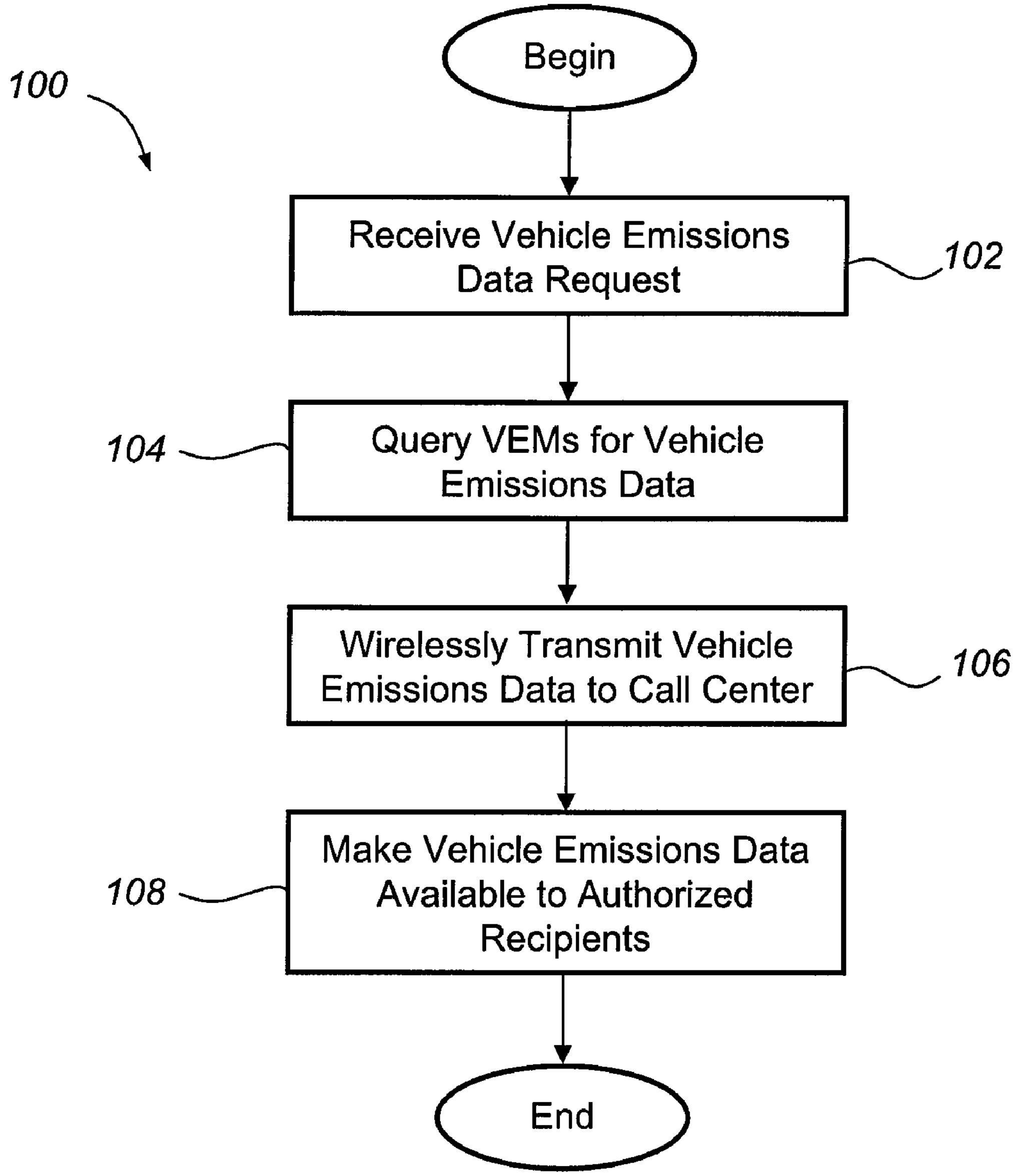
FIG. 2 is a flowchart showing some of the steps of an embodiment of a method for providing vehicle emissions data to an authorized recipient.

Turning now to FIG. 2, there is shown a flowchart demonstrating an embodiment of a method 100 that provides vehicle emissions data for purposes of governmental certification. In general, method 100 receives a vehicle emissions data request, retrieves vehicle emissions data from at least one vehicle electronic module (VEM) 60-64, uses vehicle hardware 28 to wirelessly transmit the vehicle emissions data to call center 20, and then makes the data available to one or more authorized recipients, such as governmental entities, in order to comply with government emissions standards and regulations. 'Vehicle emissions data' broadly includes all information that is representative of, or in some way pertains to, the emissions produced by a vehicle and can include, but is certainly not limited to, diagnostic trouble codes (DTCs), diagnostic execution test records, sensor readings, etc. According to several different examples, an authorized recipient can be a governmental entity like a Secretary of State or a Department of Motor Vehicles (DMV), a private entity responsible for emissions certification, or any other person or entity tasked with receiving and certifying vehicle emissions data.

Beginning with step 102, a vehicle emissions data request is received by one of several different methods. According to a first embodiment, any vehicle owner, account subscriber, designated contact, or other authorized user (hereafter broadly referred to as a 'subscriber') sends the vehicle emissions data request through interaction with one or more components of the vehicle hardware 28. For instance, the subscriber can engage a button 38 on the instrument panel and then may speak into microphone 34 to access some type of human voice interface, or the subscriber can interact with a graphic display menu, for example, in order to indicate that he or she wishes to send a vehicle emissions data request. In another embodiment, the subscriber initiates the request by first contacting the call center so that it can then wirelessly communicate the vehicle emissions data request to vehicle hardware 28. Some examples of this type of request initiation involve a user communicating with call center 20 via a wired voice connection, a wireless voice connection, or an electronic message such as a text message, instant message, or email, as examples, and instructing the call center to wirelessly send a vehicle emissions data request to the vehicle. According to another embodiment, the subscriber initiates the vehicle emissions data request through the use of a web-based interface that is associated or in some way connected with call center 20. An example of such an interface is a webpage hosted by one of the servers located at call center 20. In yet another embodiment, the vehicle emissions data request is sent by an automated request generator residing in call center 20, a component of the vehicle hardware 28, a web-based interface, or some other appropriate location. The automated generator can generate the request on a periodic basis, in response to some event or sensed condition, or in response to some other trigger event. It will be appreciated by those skilled in the art that other modes of communicating a vehicle emissions data request could also be used, and that the list above is not intended to cover all possible methods.

Once the vehicle emissions data request has been received by the vehicle hardware 28, at least one of the VEMs 60-64 is queried for vehicle emissions data, step 104. Depending on how the vehicle emissions data request was sent, the query could originate with telematics unit 32 or with some other vehicle hardware component, and causes the VEM(s) to put the requested emissions data on communications bus 40 so that it is sent to the telematics unit. According to one embodiment, engine control module 60 gathers DTCs and/or diagnostic test execution records from one or more sensors or subsystems associated with the vehicle's emissions and sends them to the telematics unit. Included in a diagnostic test generating a DTC is a diagnostic execution test record which is a listing of completed and/or non-completed tests associated with the generated DTCs. The diagnostic test execution record provides the state of the executed diagnostic tests when the DTCs were produced. If a diagnostic test is incomplete at the time of DTC upload to the call center, the DTCs may need to be resent to the call center upon completion of the non-completed diagnostic tests for accurate indication of vehicle system and subsystem performance with respect to emissions.

According to another embodiment of step 104, engine control module 60 gathers the emissions data from one or more sensors that are in contact with the exhaust gases produced by the engine. In this example, the vehicle emissions data that is sent to telematics unit 32 typically includes sensor readings pertaining to certain pollutants, including readings for: hydrocarbons (HC), carbon monoxide (CO), nitrogen oxides (NOx), fine airborne particulate matter (PM), and any other pollutants or constituents identified in either state or Federal vehicle emissions standards (i.e.—Tier 1 Federal Emissions Standards set by the Environmental Protection Agency. Of course, the vehicle emissions data sent to telematics unit 32 can also include other information such as the DTCs and diagnostic execution test records previously described, or information relating to the surrounding environment at the time the sensor readings were taken; information such as intake air flow, intake air temperature, fuel injection parameters, ignition timing, engine temperature, exhaust air flow, exhaust air temperature, and exhaust gas recirculation (EGR), to name but a few. The vehicle hardware 28 could be setup to periodically store the vehicle emissions data in the memory 52 of the telematics unit, so that the data is already there when the vehicle emissions data request is received; that is, one or more VEMs send the data to the telematics unit before the system receives the vehicle emissions data request. It should be appreciated that the aforementioned embodiments pertaining to the transmission of DTCs/diagnostic execution test records and sensor readings are only some of the examples of vehicle emissions data, and that other forms of vehicle emissions data could be used as well.

In step 106, the vehicle emissions data is wirelessly transmitted from telematics unit 32 to call center 20. This transmission preferably occurs through vehicle communications device 30 and over a wireless voice channel established with the wireless carrier system 14, however, transmission over a wireless data channel is possible as well. In addition to the vehicle emissions data, other types of information like an electronic identifier can also be sent in the same transmission. An electronic identifier can include a time stamp including the time and/or date that the emissions data was collected, an electronic vehicle identification number (VIN), or any other piece of information that helps identify the source and/or nature of the emissions data.

Figure 3:
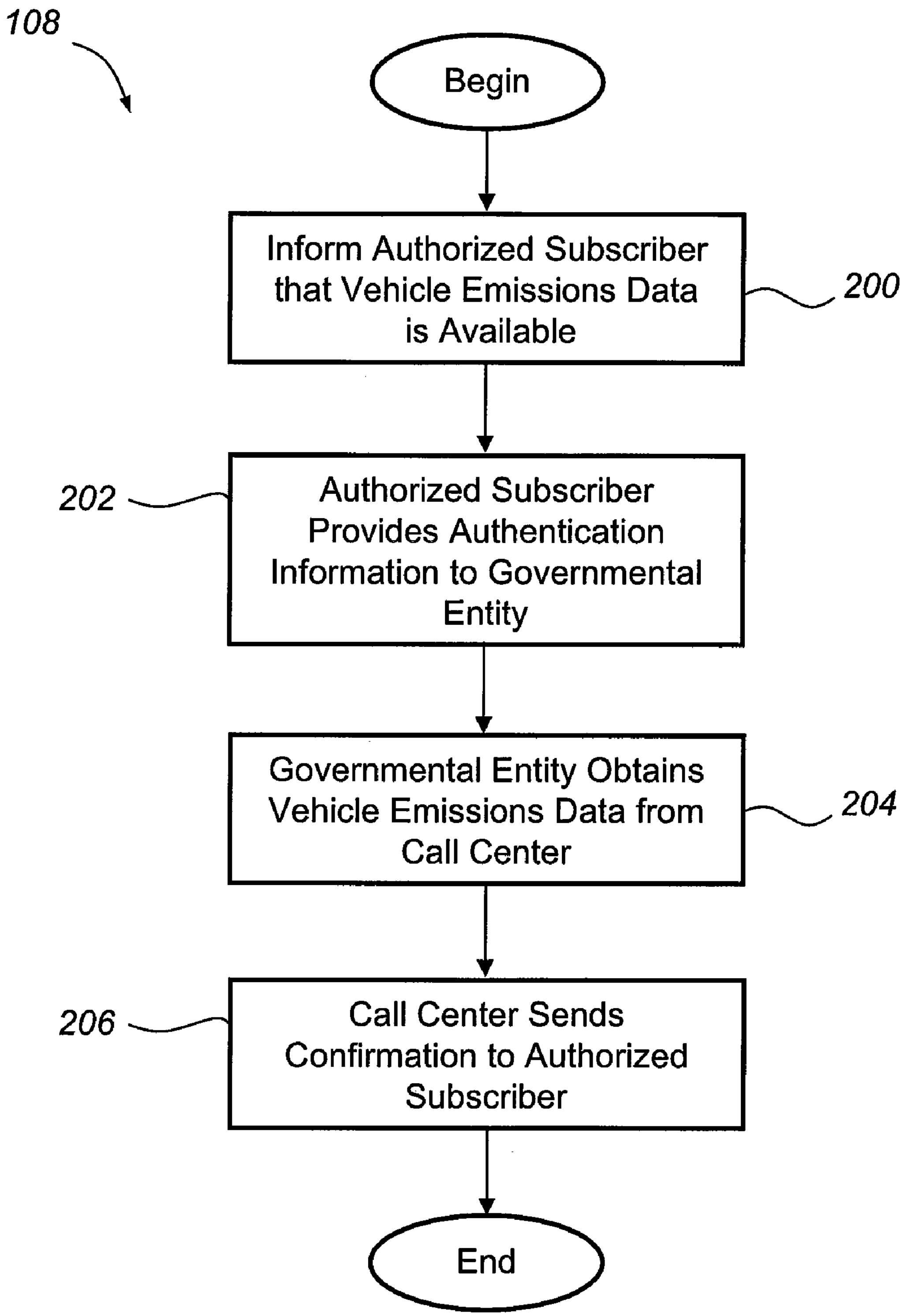
FIG. 3 is a flowchart showing a more detailed account of an embodiment of one of the steps of FIG. 2, where the authorized recipient receiving the vehicle emissions data is a governmental entity.

Next, method 100 makes the vehicle emissions data available to at least one authorized recipient, step 108, for purposes of vehicle emissions certification. It should be appreciated that there are a number of ways in which the vehicle emissions data could be made available to authorized recipients, and that the following exemplary embodiments are only directed to some of the possibilities. According to a first embodiment shown more thoroughly in FIG. 3 and in response to instructions from a subscriber, step 108 provides the vehicle emissions data to a governmental entity in order to comply with emissions standards oftentimes required when registering a vehicle or renewing a registration. Beginning with step 200, resources at call center 20 correlate the electronic identifier that was transmitted with the emissions data to a particular user or subscriber account, inform the subscriber that the vehicle emissions data is now available, and provide the subscriber with authentication information that can be used to access the emissions data. Some examples of appropriate authentication information include, but are certainly not limited to, a vehicle identification number (VIN), an account number, a mobile dialing number (MDN), a mobile identification number (MIN), a user name, a password, a pin number, a combination of these, or some other form of data that uniquely identifies and/or provides restricted access to the vehicle emissions data that was previously sent.

In step 202, the subscriber provides one or more chosen recipients, in this case a governmental entity, with the authentication information so that the recipient can directly obtain the vehicle emissions data from call center 20 and be assured that the data has not been modified by the subscriber. The governmental entity then uses the authentication information to gain access to and obtain the vehicle emissions data, whether it be DTCs/diagnostic execution test records, data pertaining to levels of certain pollutants like hydrocarbons (HC), carbon monoxide (CO), nitrogen oxides (NOx), and fine airborne particulate matter (PM), or some other form of vehicle emissions data, step 204. It should be noted that the authorized recipient may obtain the emissions data in one of a variety of ways. For example, the governmental entity can download the emissions data via a web-based interface hosted by call center 20, it may request that the emissions data be emailed or otherwise electronically sent to it, or it can use an automated or staffed phone system to obtain the emissions data, to cite but a few examples. By providing the vehicle emissions data directly from call center 20 to the governmental entity, the entity can be assured that the information has not been tampered with or in any way altered.

Lastly, call center 20 sends a confirmation message to the subscriber informing them that the emissions data has been successfully provided to the governmental entity, step 206. The confirmation informs the subscriber that the call center 20 sent the vehicle emissions data to the authorized recipient, and can also include status information as to whether or not the governmental entity successfully received the vehicle emissions data and approved the certification or registration being sought by the subscriber.

According to an alternative embodiment, step 108 omits step 200 so that once the call center receives the vehicle emissions data from the vehicle, it sends the emissions data to a properly authorized recipient without first sending it to the subscriber. In such an arrangement, the subscriber should have previously authorized the call center to proceed with such an operation before conducting the method. This way, when call center 20 comes into possession of the vehicle emissions data, it already knows who to send it to. As an example, when a subscriber account is initially established, the subscriber could, at that time, authorize the call center to gather and send emissions data to one or more governmental entities when it is time to renew their license and/or registration. This generally relieves the subscriber of further responsibilities regarding the emissions data submission process, as it could be handled automatically without further intervention on their part. As with the previous embodiment, once the emissions data is sent to a governmental entity, a confirmation message could be provided to the subscriber to inform them that the process was successfully completed.

According to yet another embodiment, it is possible for step 108 to send the vehicle emissions data to the subscriber in the form of a certified copy that cannot be modified or altered. For example, the vehicle emissions data can be sent as a printed document containing an authentication mark or other indicia, or the emissions data could be sent as a protected electronic file. With this information, the subscriber can deliver the vehicle emissions data to a governmental entity or other recipient.

It is to be understood that the foregoing description is not a definition of the invention itself, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For instance, although not specifically disclosed, it is possible for the emissions data in step 108 to only be provided to the subscriber; that is, the person who initiated the vehicle emissions data request in the first place. In that scenario, the subscriber is also the authorized recipient. All such other embodiments, changes, and modifications are intended to come within the scope of the appended claims.

As used in this specification and claims, the terms "for example", "for instance", "such as" and "like", and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for providing vehicle emissions data to an authorized recipient, comprising the steps:

(a) receiving a vehicle emissions data request authorized by a subscriber;

(b) sending the vehicle emissions data from at least one vehicle electronic module (VEM) to a vehicle telematics unit in response to the vehicle emission data request;

(c) wirelessly transmitting the vehicle emissions data from the vehicle telematics unit to a call center; and (d) making the vehicle emissions data available to the authorized recipient so that the subscriber cannot modify the vehicle emissions data, wherein the vehicle emissions data is made available to the authorized recipient by: i) previously receiving authorization from the subscriber so that the call center can provide the vehicle emissions data to the authorized recipient, and ii) providing the vehicle emissions data from the call center to the authorized recipient without first sending it to the subscriber.

2. The method of claim 1, wherein step (a) further comprises receiving the vehicle emissions data request from the subscriber through interaction with a vehicle hardware device.

3. The method of claim 1, wherein step (a) further comprises receiving the vehicle emissions data request from the subscriber through the use of a web-based interface.

4. The method of claim 1, wherein step (a) further comprises receiving the vehicle emissions data request from an automated request generator residing in at least one location selected from the group consisting of: the call center, a vehicle hardware device, and a web-based interface.

5. The method of claim 1, wherein the vehicle electronic module includes at least one module selected from the group consisting of: an engine control module, a powertrain control module, and a body control module.

6. The method of claim 5, wherein the vehicle emissions data includes at least one reading selected from the group consisting of: hydrocarbon (HC) readings, carbon monoxide (CO) readings, nitrogen oxides (NOx) readings, and fine airborne particulate matter (PM) readings.

7. The method of claim 5, wherein the vehicle emissions data includes at least one piece of data selected from the group consisting of: diagnostic trouble codes (DTCs) and diagnostic execution test records.

8. The method of claim 1, wherein step (c) further comprises wirelessly transmitting the vehicle emissions data over a wireless voice channel established between a vehicle communications device and a wireless carrier system.

9. The method of claim 1, wherein step (c) further comprises wirelessly transmitting the vehicle emissions data and an electronic identifier identifying the source or nature of the vehicle emissions data.

10. The method of claim 1, wherein the method further comprises the step: (e) sending a confirmation to the subscriber from the call center indicating that the vehicle emissions data was provided to the governmental entity.

11. A method for providing vehicle emissions data to a governmental entity, comprising the steps:

(a) receiving a vehicle emissions data request;

(b) querying at least one vehicle electronic module (VEM) for the vehicle emissions data;

(c) sending the vehicle emissions data from the vehicle electronic module (VEM) to a vehicle telematics unit in response to the vehicle emissions data request, wherein the vehicle emissions data is sent over a vehicle communications bus;

(d) wirelessly transmitting the vehicle emissions data and an electronic identifier from the vehicle telematics unit to a call center; and (e) providing the vehicle emissions data to a governmental entity by: i) informing a subscriber that the vehicle emissions data is available, ii) providing authentication information from the call center to the subscriber so that the subscriber can provide the authentication information to a governmental entity of its choice, and iii) providing the vehicle emissions data from the call center to the governmental entity chosen by the subscriber in response to a proper authorization, wherein the subscriber cannot modify the emissions data that is provided to the governmental entity and the authentication information is provided to the subscriber before the vehicle emissions data is provided to the governmental entity chosen by the subscriber.

12. The method of claim 11, wherein step (a) further comprises receiving the vehicle emissions data request from the subscriber through interaction with a vehicle hardware device.

13. The method of claim 11, wherein step (a) further comprises receiving the vehicle emissions data request from the subscriber through the use of a web-based interface.

14. The method of claim 11, wherein step (a) further comprises receiving the vehicle emissions data request from an automated request generator residing in at least one location selected from the group consisting of: the call center, a vehicle hardware device, and a web-based interface.

15. The method of claim 11, wherein the vehicle electronic module includes at least one module selected from the group consisting of: an engine control module, a powertrain control module, and a body control module.

16. The method of claim 15, wherein the vehicle emissions data includes at least one reading selected from the group consisting of: hydrocarbon (HC) readings, carbon monoxide (CO) readings, nitrogen oxides (NOx) readings, and fine airborne particulate matter (PM) readings.

17. The method of claim 15, wherein the vehicle emissions data includes at least one piece of data selected from the group consisting of: diagnostic trouble codes (DTCs) and diagnostic execution test records.

18. The method of claim 11, wherein step (d) further comprises wirelessly transmitting the vehicle emissions data and the electronic identifier over a wireless voice channel established between a vehicle communications device and a wireless carrier system.

19. The method of claim 11, wherein step (e) further comprises providing the vehicle emissions data to the governmental entity upon proper authorization of authentication information, wherein the authentication information includes at least one piece of information selected from the group consisting of: a vehicle identification number (VIN), an account number, a mobile dialing number (MDN), a mobile identification number (MIN), a user name, a password, and a pin number.

20. A system for providing vehicle emissions data to a governmental entity, comprising:

a wireless carrier system for communicating voice and/or data information;

a vehicle electronic module (VEM) for gathering vehicle emissions data from one or more sensors, wherein the vehicle emissions data includes at least one of a diagnostic trouble code (DTC) and a diagnostic execution test record;

a vehicle telematics unit for providing communication services and being connected to the vehicle electronic module (VEM) and the wireless carrier system; and a call center for processing various user requests and being connected to the wireless carrier system, wherein if a vehicle emissions data request is received, then:

i) the vehicle electronic module (VEM) sends the vehicle emissions data to the vehicle telematics unit, ii) the vehicle telematics unit sends the vehicle emissions data to the call center over the wireless carrier system, and iii) the call center makes the vehicle emissions data directly available to the governmental entity by: a) informing a subscriber that the vehicle emissions data is available, b) providing authentication information from the call center to a subscriber so that the subscriber can provide the authentication information to a governmental entity of its choice, and c) providing the vehicle emissions data from the call center to the governmental entity chosen by the subscriber in response to a proper authorization, wherein the subscriber cannot modify the emissions data that is provided to the governmental entity and the authentication information is provided to the subscriber before the vehicle emissions data is provided to the governmental entity chosen by the subscriber.

* * * * *